Nov. 23, 1943.  H. F. GODWIN  2,335,054
LAWN MOWER
Filed July 19, 1941  2 Sheets-Sheet 2
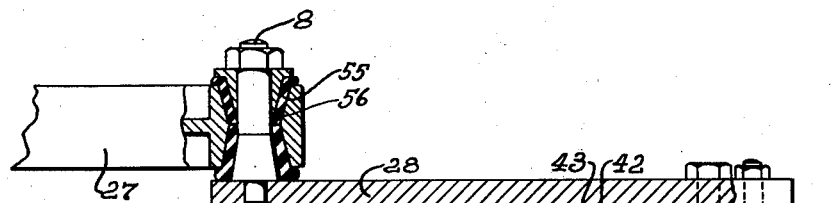
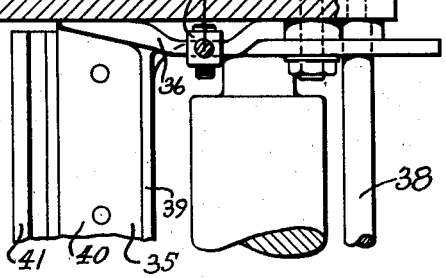
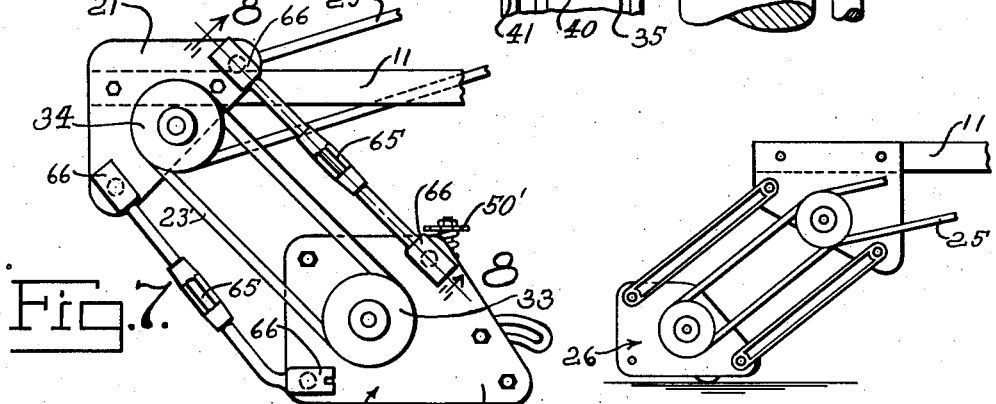
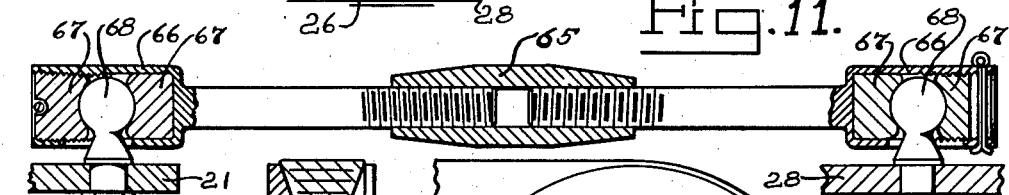
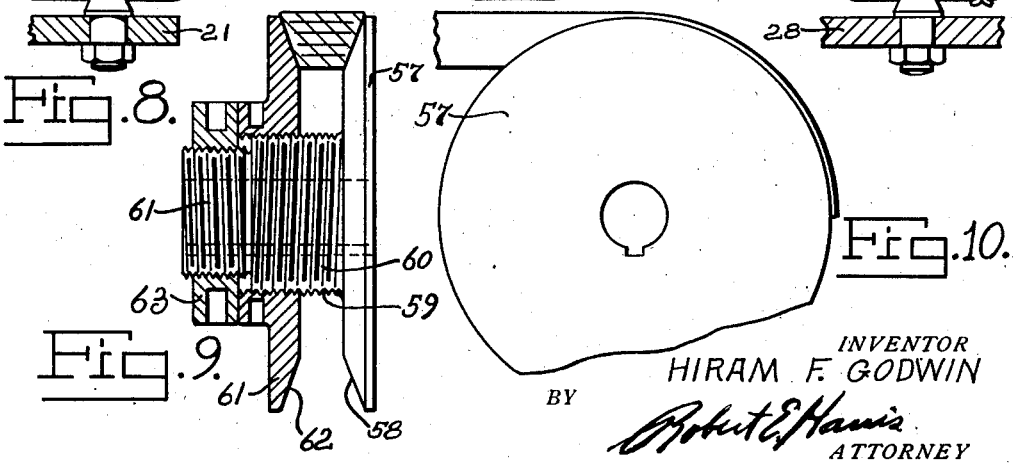
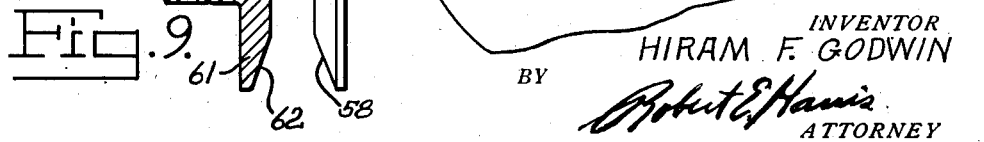
INVENTOR
HIRAM F. GODWIN
BY
Robert E. Harris
ATTORNEY Patented Nov. 23, 1943

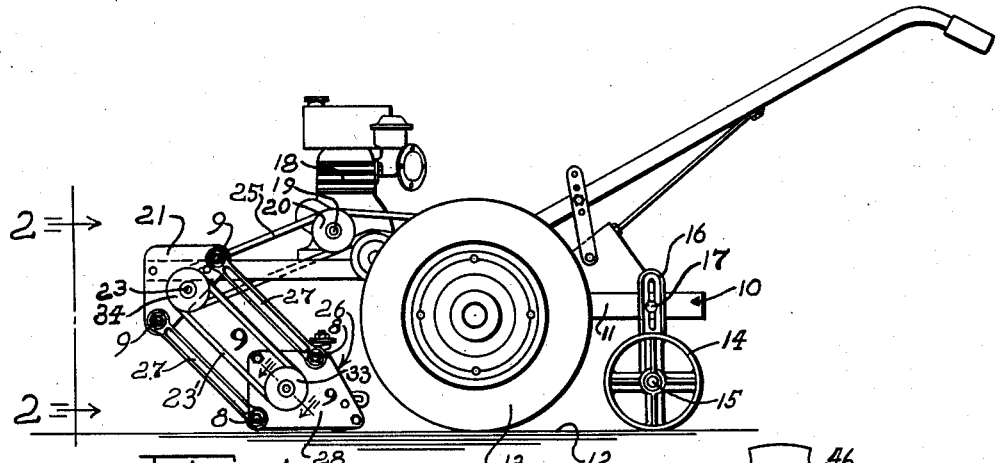
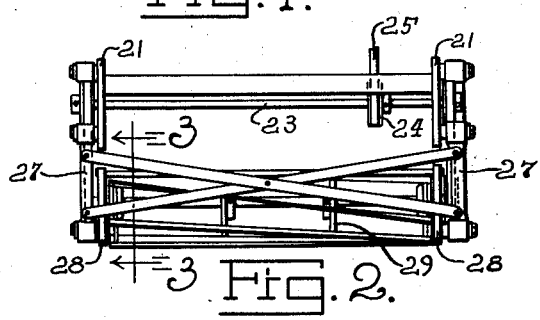
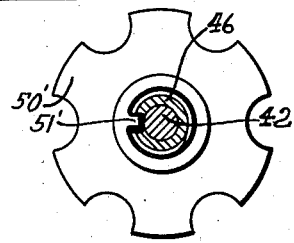
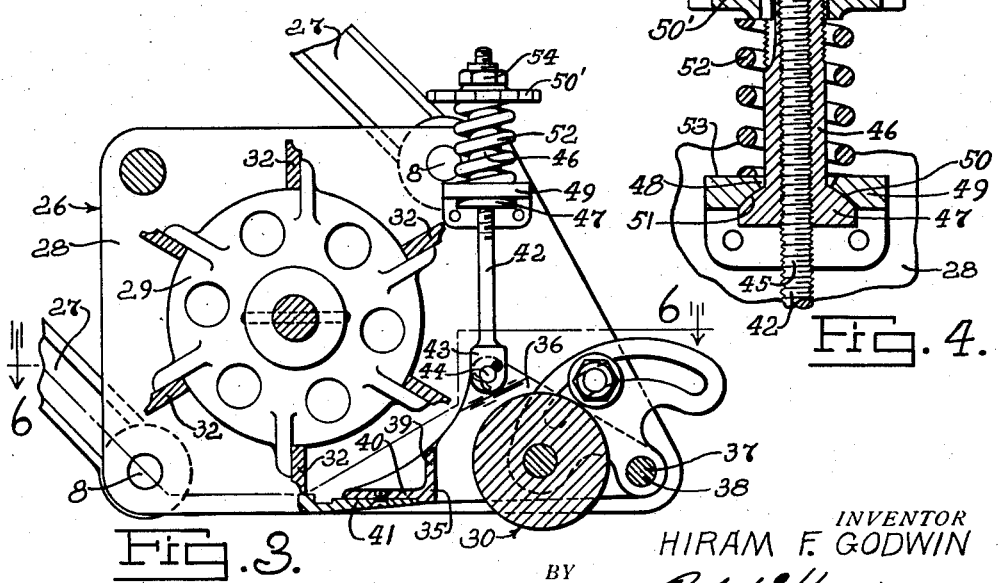

2,335,054

UNITED STATES PATENT OFFICE 2,335,054

LAWN MOWER

Hiram F. Godwin, Detroit, Mich.

Application July 19, 1941, Serial No. 403,113

3 Claims. (Cl. 56—26)

This invention relates to an improved lawn mower.

More particularly the invention pertains to the provision in a lawn mower of an improved power driven cutting unit and suspension of the latter.

One of the main objects of the invention is the provision of a parallelogram type of leverage system for connecting the cutting unit of a lawn mower to the chassis of the latter and which holds the cutting unit against tilting about its roller and consequently prevents over and under cutting of a lawn during lifting and lowering of the cutting unit as the roller passes over irregular ground.

Another object of the invention is the provision of a lawn mower cutting unit drag link system which maintains the knife of the unit at a fixed elevation above the level of the ground engaged by the roller that trails the knife and reel of the unit.

A further object of the invention is the provision in a lawn mower of a cutting unit having a single roller which is located at the trailing extremity of the unit for predetermining the height of cut and a cooperating linkage connection with the chassis of the mower which maintains the cutting knife substantially parallel to a predetermined plane independently of the action of the roller.

Additional objects of the invention are to provide improved mechanism for adjustably controlling the relationship between the knife and cutting reel of a lawn mower; to provide adjustable mechanism of this kind which positively limits the movement of the knife toward the cutting reel and which yieldably urges it toward its limiting position while accommodating resiliently opposed movement of the knife away from the reel in order to guard against injury to the cutting edges of the knife and reel when a stone or other object becomes engaged therebetween; to provide individual adjusting devices for independently and selectively varying the limit of movement of the knife toward the cutting reel and the force resiliently opposing opposite movement thereof, respectively; and to provide mechanism for making either of the foregoing two adjustments without changing the other.

Still further objects of the invention are the provision of improved mechanism for tensioning the belt by which the reel of a cutting unit is driven which eliminates the use of adjustable linkages in the cutting unit dragging suspension and thus enables fixing of the lengths of such links and the position of the cutting knife with respect to the ground level; to provide a split pulley for this purpose which has a variable effective diameter adapted to tension the belt operating thereon; and to provide a self-locking adjustable pulley of this character.

Other objects and advantages of the invention will be more apparent from the following description taken in connection with the accompanying drawings, in which:

Fig. 1 is a side elevational view of a lawn mower embodying the invention.

Fig. 2 is a fragmentary front elevational view showing the cutting unit and its support as viewed from the line 2—2 of Fig. 1.

Fig. 3 is a transverse, vertical sectional view of the cutting unit taken on the line 3—3 of Fig. 2.

Fig. 4 is a vertical sectional view showing in detail the knife adjusting mechanism with which the cutting unit is provided.

Fig. 5 is a horizontal sectional view taken on line 5—5 of Fig. 4.

Fig. 6 is a generally horizontal sectional view taken on line 6—6 of Fig. 3.

Fig. 7 is a fragmentary end elevational view of a cutting unit and support for the latter, similar to that shown in Fig. 1 but embodying a modified form of the invention.

Fig. 8 is a longitudinal sectional view taken on line 8—8 of Fig. 7.

Fig. 9 is a fragmentary sectional view of an adjustable pulley taken on line 9—9 of Fig. 1.

Fig. 10 is a fragmentary side elevational view of the pulley shown in Fig. 9.

Fig. 11 is a fragmentary side elevational view of a mower similar to that shown in Fig. 1 but embodying a further modification of the invention.

In the form of the invention illustrated in Figs. 1 to 6, inclusive, my improved lawn mower comprises a main chassis, generally designated by the numeral 10, having a frame member 11 which is supported above the ground level 12 by a pair of relatively large wheels 13 provided with pneumatic tires and smaller trailing wheels 14. The wheels 14 are mounted on an axle 15 which is carried by a pair of vertically shiftable bars 16 each of which is releasably held in a selected position by a nut 17. Mounted on the chassis frame 11, intermediate its ends is a suitable prime mover such as a gasoline motor 18 having a driving shaft 19 provided with a pulley 20.

A triangularly shaped mounting plate 21 is rigidly fixed to each side of the forward extremity of the frame 11 as shown in Figs. 1 and 2. These plates are provided with registering openings in which is journalled a shaft 23 having a pulley 24 mounted thereon at a location between the plates 21. A belt 25 drivingly connects the pulleys 20 and 24.

The cutting unit, designated by the numeral 26, is suspended from the mounting plates 21, in the manner shown in Fig. 1, by a parallelogram drag link mechanism. This mechanism comprises two pairs of links 27, the upper ends of each pair being pivoted at 9 on one of the plates 21 of each side of the frame 11, respectively. The unit 26 comprises a pair of end plates 28 secured in spaced relation by a cutting reel 29 and roller mechanism generally designated by the numeral 30. The reel has a plurality of spiral blades 32 and a central shaft on an external end of which is mounted a pulley 33, which is drivingly connected by a belt 23' to a pulley 34 mounted on an external end of shaft 23 which is in turn driven by the engine 18 through the pulley 20, belt 25 and pulley 24.

The lower ends of each pair of links 27 are pivotally connected at 8 to one of the end plates 28, respectively, of the cutting unit. The links 27 are of substantially equal length and the pivotal axes of their upper ends are spaced apart a distance substantially equal to the spacing of the pivotal axes of their lower ends in order to produce a parallelogram action which maintains the bottom plate of the cutting unit in substantially parallel planes regardless of the position to which the cutting unit is swung during operation. The axis of the shaft 23 is equally spaced from and in the plane defined by the axis of the pivots 9 of the upper ends of the links 27 and the central shaft of the reel 29 is equally spaced from and in the plane defined by the axes of the pivots 8 of the lower ends of the links 27, as illustrated in Fig. 1. The links 27 extend rearwardly and downwardly from the front end portion of the frame 11 in order to propel the cutting unit by a dragging action during forward movement of the mower.

Since the axis of the shaft 23 and the axis of the center shaft of the reel 29 are equally distant from the link pivots 9 and 8, respectively, the axis of the shaft 23 is spaced from the pivot 9 of one link 27 a distance equal to the space between pivot 8 and the axis of the central shaft, for the distance between each pivot 8 is equal to the distance between each pivot 9. The distance between these two shafts and the pulleys thereon does not vary throughout the range of swinging movement of the cutting unit 26 for this distance is measured by a line parallel and equal in length to links 27. By virtue of this structure a single driving element of fixed length, such as the belt 23', may be used to drivingly connect the pulleys 33 and 34.

The cutting unit assembly in provided with a fixed knife bed 35 which comprises a pair of triangularly shaped end plates 36 each of which is pivotally mounted at 37 on a lower corner of one of the end plates 28 of the cutting unit as shown in Fig. 3. The pivotal support for the knife bed may comprise a bolt 38 extending transversely of the unit between the plates 28 thereof. The plates 36 are connected by a web structure 39 having a seat portion 40 on which is detachably mounted a fixed cutting blade 41, the operating edge of which is disposed in adjacent relationship to the spiral blades 32.

The plate 36 and blade 41 carried thereby are adjustably positioned so as to predetermine the relation between the fixed blade and the blades of the reel 29 by apparatus including a pair of vertical stems 42 each stem having a clevis 43 at its lower extremity by which each stem is pivotally attached at 44 to the uppermost corner of a respective triangular plate of the knife bed. The upper end portion of each stem 42 has a threaded section 45 which is threaded into a sleeve 46. The latter has an enlarged radially extending abutment 47 at its lower end portion and it is rotatably received in an aperture 48 formed in a bracket 49 mounted on and extending laterally from an end plate 28 of the cutting unit. The bracket 49 has a fragmentary spherical surface 50 which abuts a corresponding surface 51 formed on the abutment 47 in order to positively, selectively limit upward movement of the stem with respect to the bracket 49. The sleeve 46 can be adjustably positioned longitudinally of the stem 42 by rotating it on its threads by the aid of a thumb adjusting nut 50' which is axially, shiftably mounted on the sleeve 46 and non-rotatably held with respect thereto by a spline 51' on the nut which is engaged in a groove 52' formed in the sleeve 46. Rotation of the nut 50' causes rotation of the sleeve 46 which results in shifting the sleeve axially with respect to the stem 42.

The knife bed 35 and blade 41 carried thereby are yieldably urged upward toward the limiting position established by the surfaces 50, 51 by a coil spring 52 which surrounds the sleeve 46 and which bears between the upper surface 53 of bracket 49 and the adjusting nut 50'. The spring is held under predetermined compression by an adjusting nut 54 which is threaded on the exterior of the upper end portion of sleeve 46 and which bears against the upper side of the nut 50'. Adjustment of the nut 54 independently varies the force with which the knife blade 41 is urged toward the blades of the reel without in any way affecting the limiting position established by the surfaces 50, 51. Likewise, rotative adjustment of the sleeve 46 varies this limiting position without in any way affecting the degree of compression of the spring 52 or the force with which the knife blade 41 is urged against the blades of the reel. With this adjusting apparatus the cutting edges of the knife blade 41 and the reel blades 32 can be protected from injury due to the engagement of stones or other hard objects therebetween by permitting the knife blade to yield away from the reel without in any way interfering with the normal setting of the knife blade as established by adjustment of the nut 50'.

In the form of the invention illustrated in Figs. 1 to 6 the links 27 of the drag link mechanism by which the cutting unit is articulated with the frame structure of the mower are of fixed length, and provision is made for cushioning impact by imposing a rubber sleeve 55, shown in Fig. 6, between the pivots 8 and the apertures 56 in the ends of the links in which these pivots are received. The sleeve 55 comprises two integral frustro-conical sections which provide rubber in a position to oppose lateral displacement of the ends of the links with respect to the pivotal pins 8. When links of fixed length are employed it is preferable to use an adjustable pulley of the type shown in Figs. 9 and 10 which is adapted for adjustably tensioning the belt which connects the pulleys 33 and 34. Only one of the latter has to be adjustable for this purpose but both may be of the same construction if desired.

The adjustable pulley illustrated in Figs. 9 and 10 includes a side plate member 57 having a beveled edge portion 58 and a central boss 59. The latter has an enlarged threaded section 60 and a smaller threaded section 61. Adjustably threaded on the section 60 is a side plate 61 which is provided with a beveled face 62 for cooperation with the face 58 of the side plate 57. The section 60 has left-hand threads while the smaller section 61 has right-hand threads. With this arrangement, when the driving action of the belt tends to unscrew the end plate 61 such action is opposed by a nut 63 on the oppositely threaded section 61 of the central portion. The effective diameter of the pulley can be readily varied by loosening or tightening the adjustable nut 63 and the device is self-locking by the driving action of the pulley thereafter.

In the form of the invention illustrated in Figs. 7 and 8 the structure is substantially identical with that shown in Figs. 1 to 6 with the exception that adjustable links are employed in place of links of fixed length. For the purpose of tensioning the driving belt the adjustable pulley shown in Figs. 9 and 10 is not necessary. The links 64 of this form of the invention comprise two sections having their adjacent ends threaded and connected together by a turnbuckle 65. Formed in the outer ends of these links are chambers 66 in which are mounted metal bearing blocks 67 between which are received a ball pivot 68 corresponding to the pivot 8 shown in Figs. 1 to 6.

In the form of the invention illustrated in Fig. 11 the structure is substantially identical with the structure shown in Figs. 1 to 6 with the exception that the cutting unit is located forwardly rather than rearwardly of the front end of the mower frame so that it is pushed rather than pulled during operation of the mower.

Although but several embodiments of the invention are herein shown and described, it will be understood that various changes including the size, shape and arrangement of parts may be made without departing from the spirit of the invention, and it is not my intention to limit the scope thereof other than by the terms of the appended claims.

What I claim is:

1. A lawn mower including a chassis frame, rolling supporting members spacing said frame from the ground, a motor on said chassis frame, a cutting unit including a frame structure having spaced end plates and cutting reel and knife elements disposed therebetween, a ground contacting element on said cutting unit spaced rearwardly of said reel and knife elements for predetermining the effective distance thereof from the ground, a pair of links of equal lengths having their lower ends pivotally attached at spaced locations to each end plate of said unit respectively, the upper ends of each of said pairs of links being pivotally attached to opposite sides of said chassis frame at locations spaced equal to the spacing of the lower ends of said links for swingably supporting said cutting unit and moving the latter in unison with said chassis frame, said links being adapted to retain said knife in planes parallel to a predetermined plane during movement of said cutting unit relative to said chassis frame and driving mechanism including a rotative driving element mounted on one side of said frame having an axis substantially in the plane of the upper ends of the pivots of the links of the latter side of said frame and a rotative driven element on said reel having an axis located substantially in the plane of the pivots of the lower ends of said pair of links, the axes of said elements being spaced equal distances from the upper and lower pivots of one link of said pair of links and a drive transmitting member operatively connecting said elements.

2. A lawn mower including a chassis frame, rolling supporting members spacing said frame from the ground, a motor on said chassis frame, a cutting unit including a frame structure having spaced end plates and cutting reel and knife elements disposed therebetween, a ground contacting element on said cutting unit spaced rearwardly of said reel and knife elements for predetermining the effective distance thereof from the ground, a pair of links of equal lengths having their lower ends pivotally attached at spaced locations to each end plate of said unit respectively, the upper ends of each of said pairs of links being pivotally attached to opposite sides of said chassis frame at locations spaced equal to the spacing of the lower ends of said links for swingably supporting said cutting unit and moving the latter in unison with said chassis frame, said links being adapted to retain said knife in planes parallel to a predetermined plane during movement of said cutting unit relative to said chassis frame, and driving mechanism operatively connected with said motor having rotative driving and driven elements provided with axes located substantially midway between the upper and lower pivots of the links at one side of said unit respectively, and a single drive transmitting member connecting said elements.

3. A lawn mower including a chassis frame, rolling supporting members spacing said frame from the ground, a motor on said chassis frame, a cutting unit including a frame structure having spaced end plates and cutting reel and knife elements disposed therebetween, a ground contacting element on said cutting unit spaced rearwardly of said reel and knife elements for predetermining the effective distance thereof from the ground, a pair of links of fixed equal lengths having their lower ends pivotally attached at spaced locations to each end plate of said unit respectively, the upper ends of each of said pairs of links being pivotally attached to opposite sides of said chassis frame at locations spaced equal to the spacing of the lower ends of said links for swingably connecting said cutting unit and chassis frame, said links being adapted to retain said knife in planes parallel to a predetermined plane during movement of said cutting unit relative to said chassis frame, and driving mechanism operatively connecting said cutting reel with said motor including a driving pulley on said chassis frame having an axis located substantially in the plane of the pivots of the upper ends of one pair of said links and a driven pulley on said reel having an axis located substantially in the plane of the pivots of the lower ends of said latter pair of links, the distance between each of said pulley axes and the adjacent pivot respectively of one of said links being substantially equal, and a belt connecting said pulleys, the distance between the axes of said pulleys being substantially constant throughout the range of swinging movement of said cutting unit.

HIRAM F. GODWIN.